United States Patent Office 3,669,523
Patented June 13, 1972

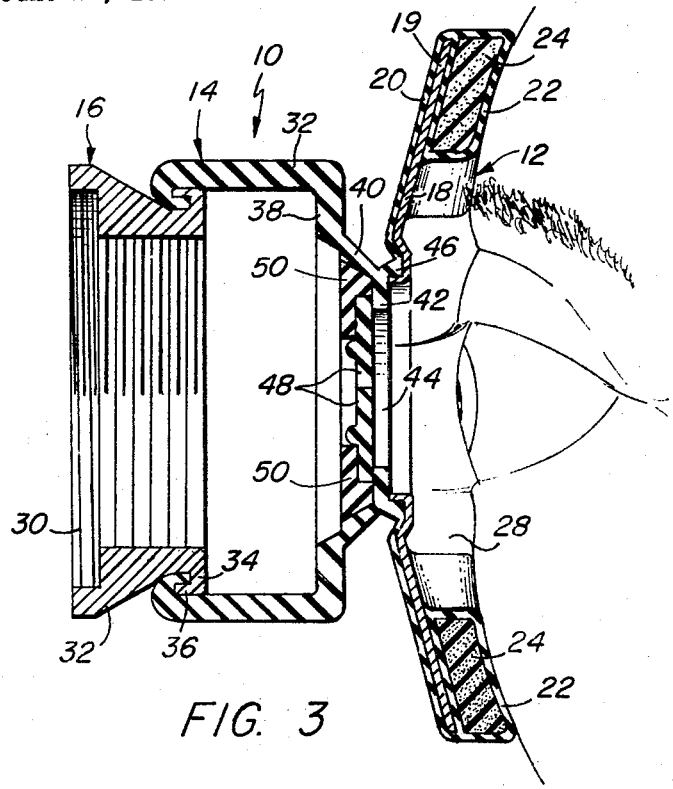
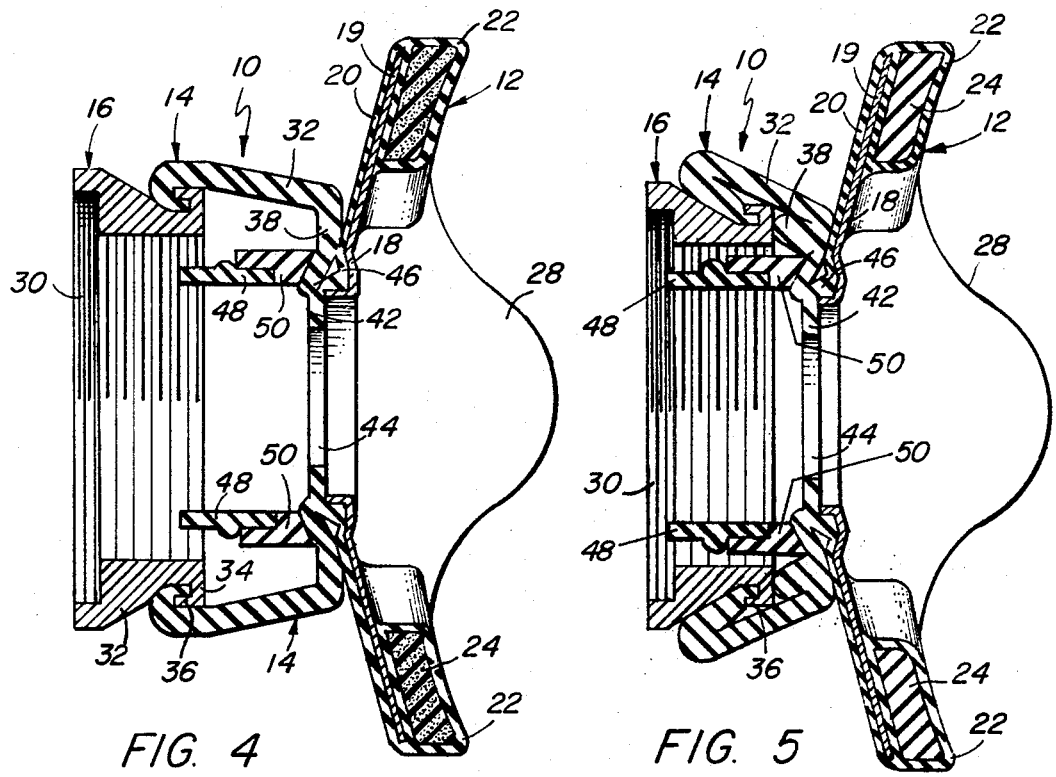
FIG. 3
FIG. 4
FIG. 5

3,669,523
PROTECTIVE EYESHIELD
Oliver J. Edwards, Jr., Rochester, N.Y., assignor to
Raytheon Company, Lexington, Mass.
Filed June 22, 1970, Ser. No. 48,396
Int. Cl. G02b 23/16
U.S. Cl. 350—57
7 Claims

ABSTRACT OF THE DISCLOSURE

An eyeshield which applies reduced peak pressures to the head of a user, comprising a mounting base and an eye seal section interconnected by a rubber spring section which rolls upon itself when subjected to recoil and other pressures, and including an axial aperture with covering flaps adapted to automatically open when the device is subjected to relatively light pressures.

BACKGROUND OF THE INVENTION

In the manufacture and use of eyepieces for various types of optical devices, including weaponry, the eyepieces usually have had long eye relief. For example, the usual rifle sight has an inverting eyepiece and a narrow field of view, for which the eye relief can easily be several inches. Under such circumstances the eyepiece does not come close to contacting the head of a user.

However, night vision devices use a magnifier-type eyepiece, where the eye relief can scarcely exceed the focal length. For example, an image intensifier or image converter requires an eyeshield which provides adequate cushioned support to prevent eye contact, with short relief, but which also permits escape of light onto the face of the user, which illumination can disastrously disclose the user's position.

Furthermore, while such devices have been provided heretofore with eyeshields which bear upon the face of a user, it has been found that they bear more or less uniformly against all the flesh around the eye socket, and can slip into the eye socket to damage the eye. For example, one type of automatic-fire rifle and one type of grenade launcher when fired exerted a peak force against the user's head of more than 50 pounds. This peak force was due to the fully flexible nature of the eyeguard or eyeshield in use at the time. The recoil pressure was not distributed over the relative travel between scope and head, but occurred in the last fraction of recoil travel.

More serious than its inadequacy as a pressure-averaging recoil spring, the prior art eyeguards tested do not exert recoil force against the cheekbone and brow ridge, but very easily slip into the eye socket, resulting in injury to the eyes. Finally, such eyeguards fold against the side of the nose, blistering or stripping nasal skin after prolonged periods of use.

SUMMARY OF THE INVENTION

The present invention overcomes the above and other disadvantages of prior art eyeshields by the provision of a lightweight, rugged inexpensive device which lowers peak recoil pressure against the head with a minimal eye relief requirement and produces a marked increase in comfort over protracted periods of use as well as a marked increase in safety by preventing injury to the critical parts of the eye and nose even in extreme recoil. The present invention also provides a novel light seal and can be equally well used with either the right or left eye.

In accordance with this invention the eyeshield delivers recoil to only the bony portions of the user's head completely outside the eye socket, which recoil furthermore is reduced by the invention to a peak pressure of only about 12–15 pounds upon the head (when compared with the specific example of the rifle and grenade launcher mentioned above). This is accomplished by utilization of a structure wherein thrust against the head is delivered over the full relative motion which is brought smoothly to zero rather than with a high peak pressure at the end of permissible recoil motion as in the prior art.

This latter feature is achieved by a rubber wall which deforms with a combination of compressing and rolling up such that the face-seal pressure is substantially constant during recoil. The mounting base is a rigid ring which interfaces this recoil-averaging member with the eyepiece. A rigid or semi-rigid face-seal skeleton bottoms against the mounting base in extreme recoil, distributing the shock to the brow ridge and cheekbone.

A further desirable feature is a built-in light trap which snaps open with a one pound pressure and snaps shut when the instrument is removed from the face, thus preventing escape of any illumination generated within the device to which the eyeshield is attached.

BRIEF DESCRIPTION OF THE DRAWING

Other objectives and advantages of the invention will become apparent from the hereinafter included description taken in connection with the accompanying drawings, wherein:

FIG. 3 is an enlarged axial sectional view of the eyeshield illustrated in FIGS. 1 and 2 showing it in unloaded position;

FIGS. 4 and 5 are views similar to FIG. 3 showing the eyeshield in normal load position and full recoil position respectively;

DESCRIPTION OF THE PREFERRED EMBODIMENTS

Figure 1:
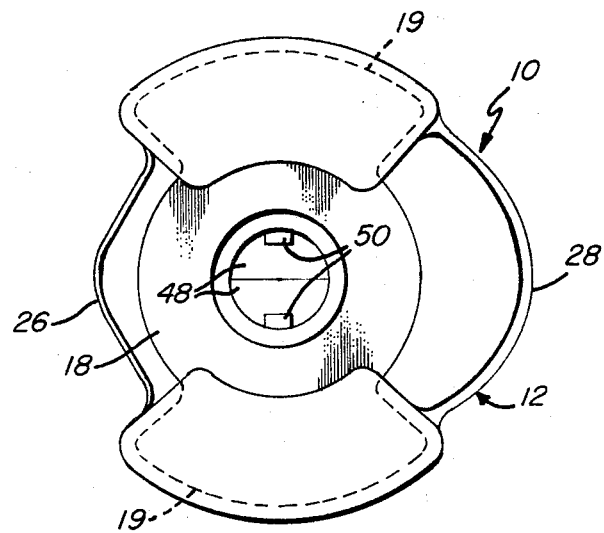
FIG. 1 is a rear elevational view of an eyeshield embodying the invention.
Figure 2:
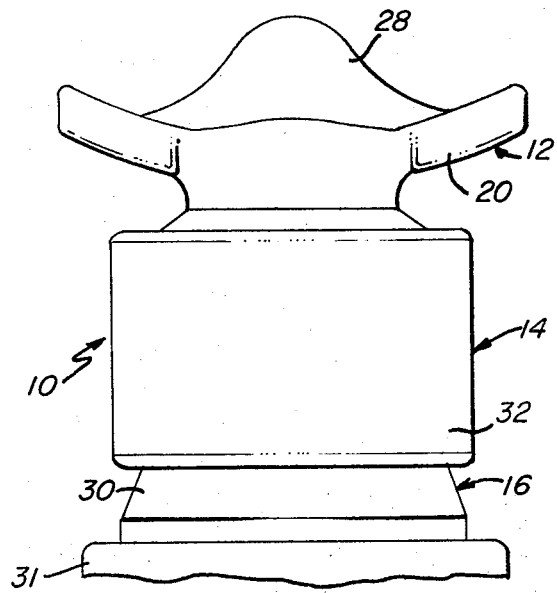
FIG. 2 is a plan view of the eyeshield shown in FIG. 1.

Referring to the drawings, and more particularly to the embodiment illustrated in FIGS. 1–5, the eyeshield 10 comprises basically three portions or sections, a face seal section 12, a recoil spring section 14, and a mounting base section 16. The face seal 12 is made of a rigid or semi-rigid metal or plastic skeleton or frame 18 of contoured shape including upper and lower extensions 19 and having a molded-on silicone rubber layer 20 on its front surface. The contour of skeleton 18 is determined by its function of transitioning from a rotationally symmetric base to the rubber cushions 24. The layer 20 transitions from an axially symmetric front, around the edge of the skeleton 18 to two support pads 22 at the rear. Pads 22 may be of any suitable resilient construction and are shown as resilient foam rubber cushions 24 encased within the rubber material. Pads 22 are located at the upper and lower extremities of the device and are adapted to bear against the brow ridge and cheekbone, respectively, as shown in FIG. 3.

The skeleton 18 and pads 22 are molded into or otherwise suitably attached to a rubber shape which includes thin curtains 26 and 28 for light seals on the nasal and temporal sides respectively, thus sealing the eyeshield against light leakage. The configuration of the foam pads and rigid skeleton is such that no part of the eyepiece can make contact with the fleshy parts of the user's eye under eyepiece recoil.

The mounting base section 16 comprises a rigid metal or plastic ring 30 to which one end of a cylindrical rubber wall 32 is attached. Ring 30 is shown with a threaded inner surface as a typical interface for attaching the eyeshield to an instrument 31 such as an optical device, light amplifier, or the like with which it is to be used. The ring 30 has a conically-shaped midsection 32 and a flange 34 at its rear periphery, the flange having a forwardly directed lip 36 which is firmly embedded within the molded wall 32 for providing a secure connection therebetween.

This recoil spring section 14 includes the cylindrical rubber wall 32 which has at its rear end an integral rubber diaphragm 38. Diaphragm 38 is provided with a normally rearwardly tapered member 40 (FIG. 3) to which is integrally attached an annular portion 42, the central opening therein being an aperture 44 which is axially disposed. A rearwardly extending portion 46 of the tapered member 40 is integrally bonded or molded to the layer 20 on skeleton 18 whereby the face seal section 12 is connected to the recoil spring section 14.

An additional novel structural feature of the invention is the provision of an iris in the form of two flaps 48 which are attached by integrally molded or bonded supports 50 to the front surface of diaphragm 38 in such a manner that when the diaphragm is in normal unstressed position the flaps 48 will block the aperture 44 in the annular portion 42, as shown in FIG. 1. However, the flaps 48 may be opened by pressure upon the diaphragm, as will be described.

In accordance with this invention, the eyeshield's improved safety and shock-absorbing characteristics are achieved by the described structure which permits essentially a two-motion load-absorbing action which delivers to the user's head a peak pressure of only about 12–15 pounds when used with devices which, with prior art eyeshields, delivered peak pressure of more than 50 pounds. This two-motion action, however, averages recoil impulse over its full travel and thus avoids peak shock at the end of travel.

Figure 6:
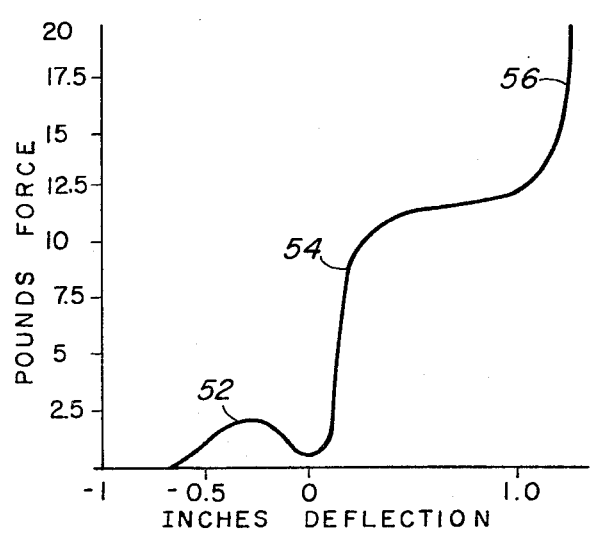
FIG. 6 is a force displacement curve as produced by an eyeshield embodying the invention.

FIG. 6 depicts what is believed to be an ideal curve upon which the present eyeshield design is based. The first hump 52 in the curve, in accordance with human engineering design considerations, serves as a null position indicator such that the user can comfortably keep proper axial eye location within the exit pupil. The curve relatively rapidly climbs as indicated at 54 to some 10–12 pounds and then, as indicated at 56, climbs steeply again as the eyeshield approaches maximum deflection. Such a spring constant can only be achieved in a complex shape such as a rolling spring, rather than a compressing spring, to achieve constant force displacement.

The present invention uses the concept of a rolling spring rather than a folding or compressing spring. In use, the molded rubber recoil spring section 14 adjusts first to a normal load position as shown in FIG. 4 and then to a full recoil position as shown in FIG. 5. The assembly is placed over the eye of the user with the two pads 22 bearing against the brow ridge and cheekbone respectively. In this position the rubber curtains 26 and 28 function as light seals in the nasal and temporal areas. It should be noted that the assembly is top and bottom symmetrical so that it can be rotated for use with either eye.

In operation, the eyeshield 10 is placed in position of use over the eye and pressed slightly. Such pressure will firmly locate the device on the user's face and at the same time will open the aperture 44. This is achieved by the movement of the skeleton 18 forwardly, thus deforming the diaphragm 38 as shown in FIG. 4. This causes the flaps 48 to swing apart out of blocking relation to the aperture 44. In this way any image entering the eyeshield 10 from instrument 31 will reach the user's eye. To shut out the image, the user need only release the pressure of the device on his face, whereupon the diaphragm and flaps will return to the normal position shown in FIG. 3.

When the device is in the position of use shown in FIG. 4, it may be subjected to recoil pressure, at which time the mounting base section 16 will tend to move back toward the eye seal section 12. As a result, the skeleton 18 will move with respect to the recoil spring section 14, forcing the rubber cylinder to roll upon itself as shown in FIG. 5. The diaphragm 38 will also deform, as shown, to compress between the face seal section 12 and the mounting base section 16. Face seal contact is approximately constant and the pressure of such recoil is distributed over the bony facial structure.

It has been found that peak pressure with a device of this character will be about 12–15 pounds in comparison with prior art devices which under the same conditions will produce peak pressure of over 50 pounds.

Figure 7:
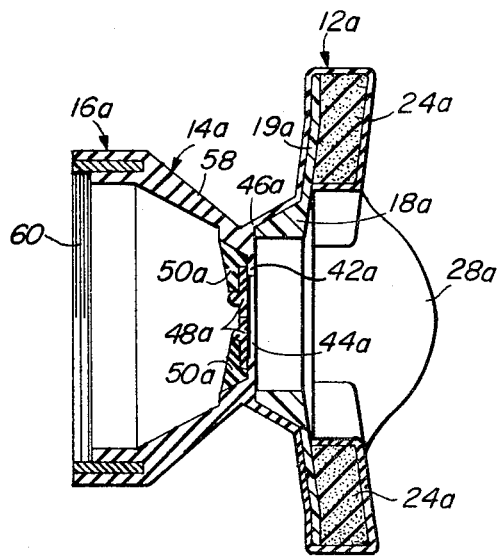
FIGS. 7, 8 and 9 are views similar to FIGS. 3, 4 and 5 respectively, illustrating another modification of the invention.
Figure 8:
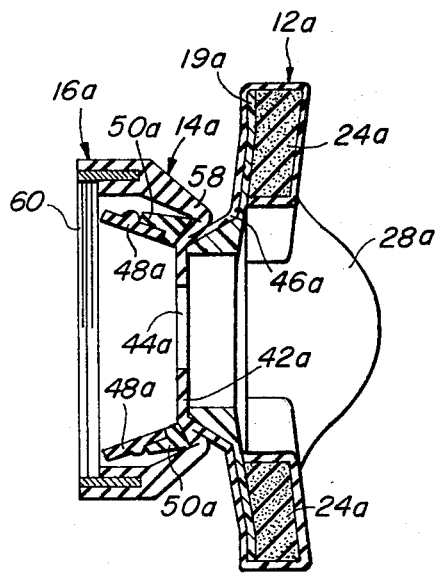
Figure 9:
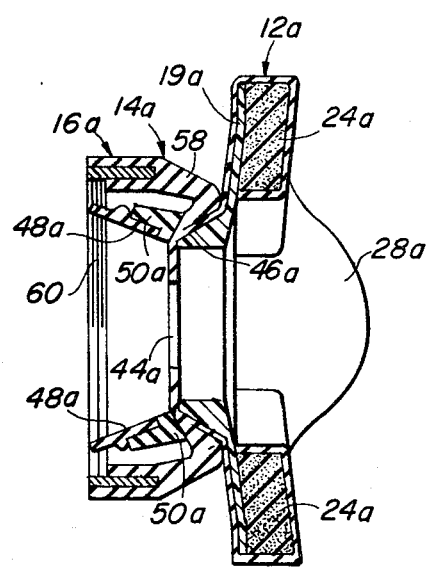

Referring now to FIGS. 7–9, a slightly modified embodiment of this invention employs a recoil spring section 14a which is in the form of a hollow rubber cone 58 having a thickened large forward end in which is embedded a rigid metal or plastic ring 60 which may be threaded or otherwise shaped for attachment of the device to an instrument with which the device is to be used. Ring 60 and the encompassing portion of the rubber constitute the mounting base section 16a.

The face seal section 12a includes a rigid metal or plastic skeleton 18a with extending portions 19a which support the resilient pads 24a. The inner edge portion of the skeleton is enlarged and overlaid with a layer 46a of rubber which interconnects the rubber over the main portion of the skeleton with the conical spring portion 58. Porton 58, similar to spring member 32 of the device in FIG. 3, has a diaphragm 42a to which flaps 48a are attached as by supporting members 50a whereby the central aperture 44a in the diaphragm may be closed when the device is in normal relaxed position as shown in FIG. 7.

In the operation of this embodiment, light pressure of the eyeshield on the face of a user will cause the enlarged inner portion of the skeleton 18a to press against the diaphragm 42a to cause the major portion of the diaphragm to flex forwardly as shown in FIG. 8. In this position the adjacent end portion of the spring member 58 will roll slightly inwardly upon itself, as shown.

When the device is subjected to recoil pressures, such pressures will cause the mounting base section 16a to move toward the eye seal section 12a, whereupon the spring member 58 rolls upon itself still farther as shown in FIG. 9.

When removed from the face, the various parts of the device will quickly return automatically to the relaxed positions shown in FIG. 7.

It will be apparent that the invention shown and described will overcome the recited and other disadvantages of prior art devices. It should be understood that although only two embodiments of the invention have been disclosed, other modifications and changes may be made by those skilled in the art without departing from the spirit of the invention as expressed in the accompanying claims. Therefore, all matter shown and described is to be interpreted as illustrative and not in a limiting sense.

I claim:

1. An eyeshield comprising a rigid contoured face seal section, a rigid annular base section, and a resilient intermediate section interconnecting the face seal and base sections, said intermediate section including a diaphragm portion having an axial aperture therein, said face seal and base sections being positioned in predetermined spaced relation by the intermediate section when said intermediate section is in relaxed unstressed condition, and said intermediate section has a configuration such that it provides constantly increasing pressure resistance and rolls upon itself when the face seal and base sections are moved toward each other.

2. An eyeshield comprising a face seal section, a rigid base section, and a resilient intermediate section interconnecting the face seal and base sections, said base section being a ring having a conically-shaped outer circumferential surface with its smaller end sealed to the intermediate section, said intermediate section having a configuration such that it provides constantly increasing pressure resistance and rolls up on itself and outwardly on said conically-shaped surface of the base section when said face seal section and base section are moved toward each other.

3. An eyeshield comprising a face seal section, a rigid base section, and a resilient intermediate section interconnecting the face seal and base sections, said intermediate section being a conically-shaped tube having its smaller end sealed to the face seal section, said tube having a varying wall thickness which tapers from relatively thin at said smaller end to relatively thick at its larger end, said tube being so configured that it will roll up on itself when the face seal section and base section are moved toward each other with said varying wall thickness providing constantly increasing resistance to such movement as the movement progresses.

4. An eyeshield comprising a face seal section, a base section, and a resilient intermediate section interconnecting the face seal and base sections, said intermediate section being movable with respect to the base section when the device is subjected to axial pressure and being so structured as to provide constantly increasing pressure resistance throughout such movement.

5. An eyeshield as set forth in claim 2 wherein said intermediate section is comprised of deformable material and has a configuration such that it rolls upon itself when said face seal and base sections are moved relative to each other.

6. An eyeshield comprising a face seal section including a rigid skeleton, a rigid base section, and a resilient intermediate section interconnecting the face seal and base sections and having a configuration such that it provides constantly increasing pressure resistance and rolls upon itself when the skeleton and base section are moved relative to each other.

7. An eyeshield as set forth in claim 6 wherein said intermediate section is of a generally hollow cylindrical shape with one end being turned inwardly back on itself, said end being fixed to the base section, the other end being fixed to the face seal section, the base section and face seal section being movable relative to one another when pressure is exerted thereon, and said skeleton consequently being pressure engageable with the adjacent end of the intermediate section for causing same to roll on itself for absorbing such pressure.

References Cited

UNITED STATES PATENTS 3,390,931   7/1968   Luning et al. _____ 350—57

FOREIGN PATENTS 16,543   7/1913   Great Britain _____ 350—57
112,989   2/1918   Great Britain _____ 350—57

JOHN K. CORBIN, Primary Examiner

R. L. SHERMAN, Assistant Examiner

U.S. Cl. X.R.

2—14 L